March 11, 1924.  M. MINGO  1,486,784

AUTOMOBILE JACK

Filed Nov. 7, 1922   3 Sheets-Sheet 1

Inventor
Major Mingo
by his Attorneys

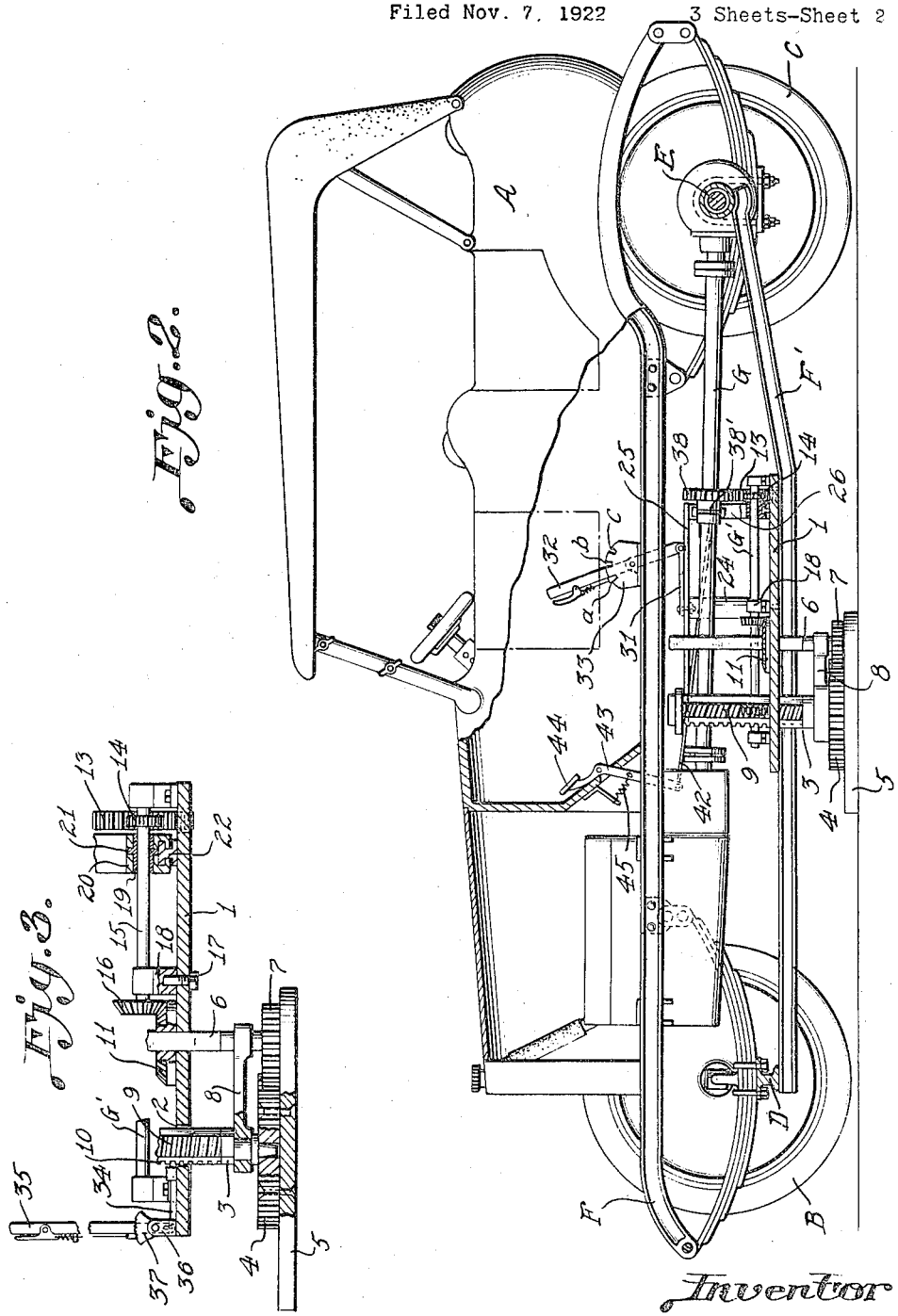

March 11, 1924.                                               1,486,784
                             M. MINGO
                          AUTOMOBILE JACK
                  Filed Nov. 7, 1922        3 Sheets-Sheet 3
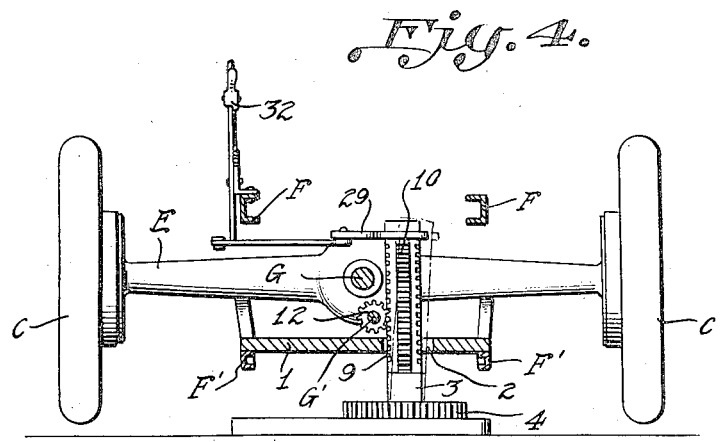
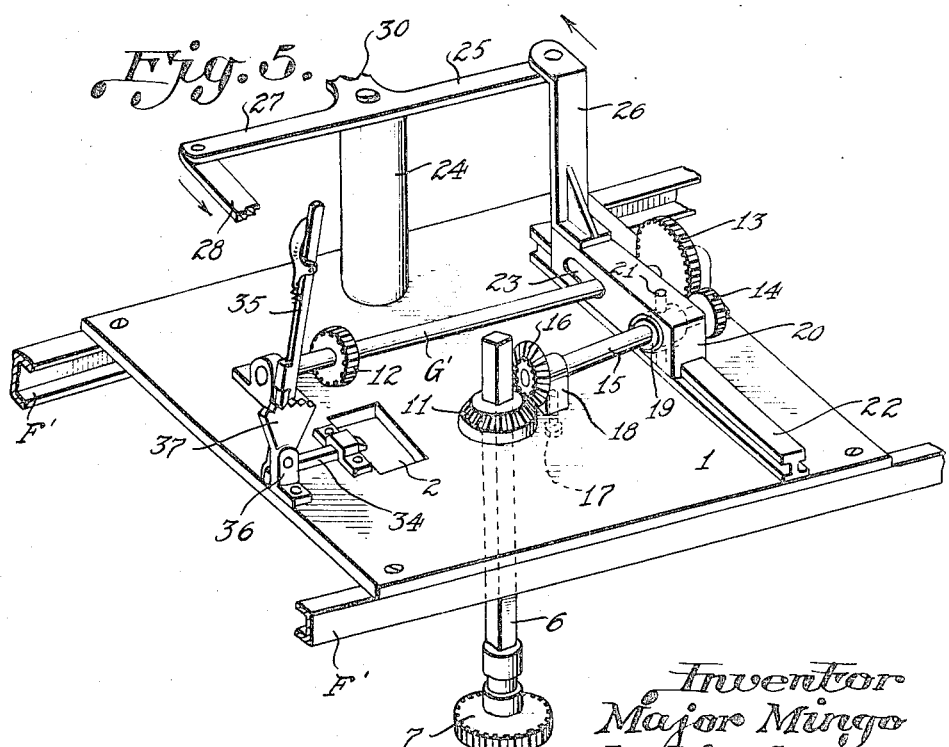

Patented Mar. 11, 1924.

1,486,784

UNITED STATES PATENT OFFICE.

MAJOR MINGO, OF DODGE CITY, KANSAS.

AUTOMOBILE JACK.

Application filed November 7, 1922. Serial No. 599,558.

*To all whom it may concern:*

Be it known that I, MAJOR MINGO, a citizen of the United States, and resident of Dodge City, in the county of Ford and State of Kansas, have invented certain new and useful Improvements in an Automobile Jack, of which the following is a specification.

An object of my invention is to provide a jack that can be carried on the under side of the automobile, and when desired may be made to engage the ground and the machine lifted clear of the ground for the purpose of access to the underside or to lift it out of the mud.

A further object of my invention is to provide an attachment of this character by which the automobile when raised can be turned about a vertical axis to any desired degree.

Still another object is to provide means whereby power for both the lifting and turning movements can be obtained from the engine of the machine, with additional means for lifting the machine by manual operation if desired.

Other objects will be apparent from the following detailed description and the appended claims.

In the drawings:

Figure 2 is a side elevation of the automobile with parts broken away and parts in section on the line 2—2 of Figure 1.

Figure 3 is a longitudinal section of a part of the device.

Figure 4 is a transverse section on the line 4—4 of Figure 1.

Figure 5 is a perspective view of a portion of the device.

Figure 1:
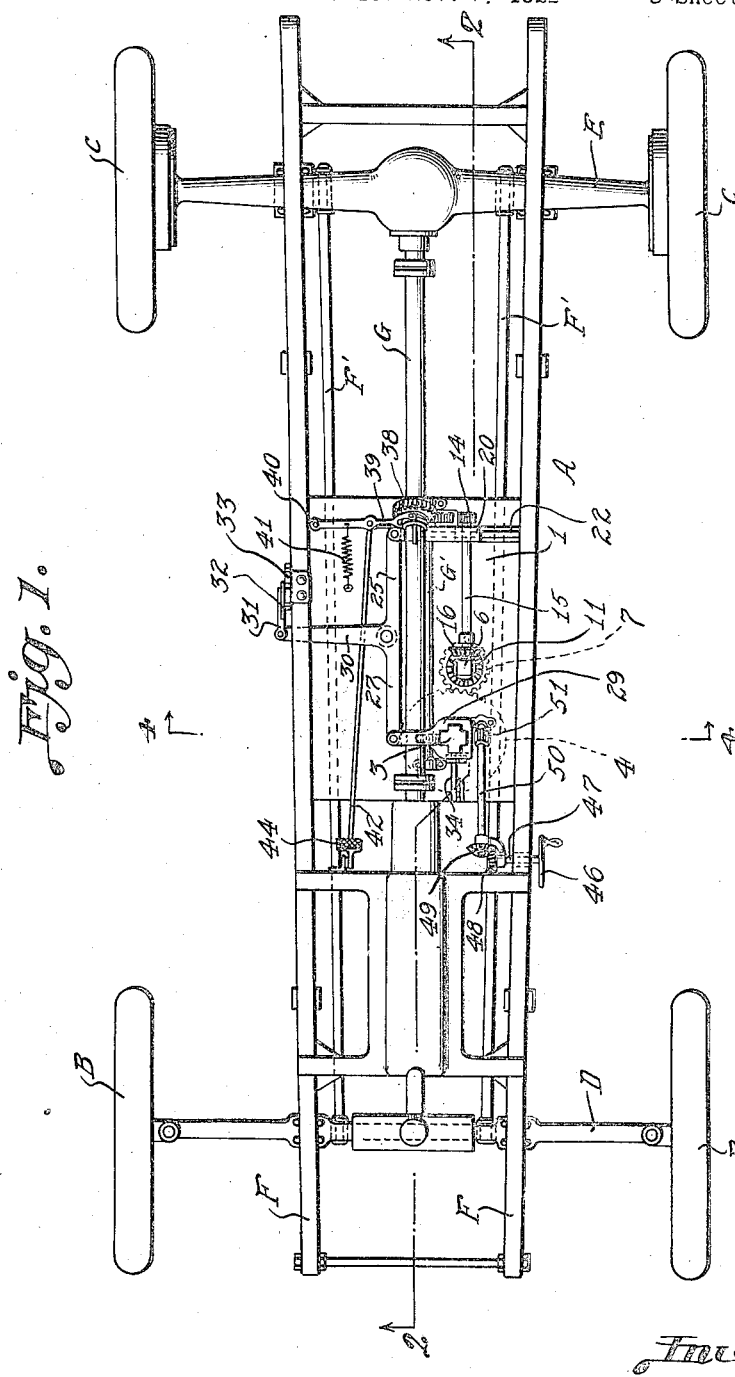
Figure 1 is a plan view of the chassis of the automobile with all superstructure removed, showing the relation of the attachment to the body of the vehicle.

There is illustrated an automobile A having front wheels B and rear wheels C, a front axle D and a rear axle E, side frame bars F and a main driving shaft G which transmits power from the engine to the rear axle. These parts may be of any old or desired construction and in themselves constitute no part of my invention, nor is the invention limited to any particular construction of these parts.

On a pair of lower frame bars F' carried by the front and rear axles is supported the base member 1 of my attachment. This is preferably narrower at the front than at the rear in order that the wheels will not come in contact therewith when the machine is turned. Through an opening 2 in the member 1 extends a standard 3 which has its lower end tapered and stepped in an opening in a gear 4 bolted or otherwise fastened to a pedestal or base 5. Through another opening in the member 1 extends a vertical shaft 6, here shown as square, which has at its lower end a gear 7 adapted to mesh with the gear 4. The shaft 6 is supported at its lower end by an arm 8 which is provided at its other end with an opening through which the standard 3 extends. The standard is shouldered above the arm 8 thus retaining it in proper position, and the standard is made circular where it passes through the arm 8, thus permitting the arm to turn about the standard. This detailed construction is clearly shown in Figure 3.

As shown in Figure 1 the standard 3 is shaped in cross section somewhat like a Greek cross, as it has teeth on all four sides. The teeth 9 on two opposite sides are formed to engage a gear and the teeth 10 on the other two sides are adapted to be engaged by a detent, as hereinafter pointed out. The shaft 6 is provided near its upper end with a bevel gear 11 adapted to turn therewith.

The driving shaft G' is provided with two gears 12 and 13, the gear 12 being intended to mesh with the teeth 9 of the standard when it is desired to raise the machine. The gear 13 is adapted to mesh with the gear 14 on a shaft 15 which has at its other end a bevel gear 16 meshing with the bevel gear 11 on the shaft 6. The shaft 15 is supported at one end by a bolt 17 which passes through the base 1 and engages a collar 18 on the shaft, thus permitting pivotal movement of the shaft about the bolt 17. The other end of the shaft 15 is carried by a collar 19 fitting loosely within a slide member 20 and pivotally mounted therein by the pin 21. This slide member is formed to engage a guide member 22 with which it interlocks to prevent any relative movement except the longitudinal sliding movement. This slide and guide member are slotted at 23 to provide for the passage of the shaft G'.

The stepped lower bearing of the standard 3 permits a limited tilting movement thereof as indicated in dotted lines in Figure 4, which is sufficient to move the teeth 9 into and out of engagement with the gear 12. Means are provided for moving the shaft 15 and the standard 3 simultaneously, so that when the gears 13 and 14 are disconnected, the teeth 9 will be brought into engagement with the gear 12, and vice versa. This means consists of a three-armed lever pivoted to a post 24 carried by the member 1. One arm 25 is connected by a rigid member 26 to the slide 20; another arm 27 is connected to a link 28 attached to a member 29 embracing the standard 3; and the third arm 30 is connected by a link 31 to a hand operated lever 32 fastened to a side bar F and having the usual spring operated detent to engage notches in a segment 33. It will be seen by an examination of Figure 5, that when the lever is rocked to move the parts in the direction of the arrows in this figure, the gears 13 and 14 will be moved into mesh, while the standard 3 will be rocked into the dotted line position of Figure 4, in which the teeth 9 are out of engagement with the gear 12.

The segment 33 is provided with three notches a, b and c. When the detent on the lever 32 engages notch a, the parts will be in the Figure 5 position; when it engages notch b, they will be in intermediate or rest position, the gears 13 and 14 being disengaged and the teeth 9 and gear 12 also being disengaged; while when it engages notch c, the teeth 9 will engage the gear 12 and the gears 13 and 14 will be disengaged. To hold the frame member 1 in definite relation to the standard 3 whenever desired, there is provided a detent 34 adapted to engage the teeth 10 on the standard. This detent is operated by a lever 35 pivoted to a lug 36 on the frame member 1 and having the usual spring pressed detent engaging the teeth of a segment member 37.

Splined to the driving shaft G is a gear 38 having a collar or sleeve 38' engaged by a yoke 39 pivoted at 40 to the frame 1 and normally drawn in one direction by a spring 41. A rod 42 is attached to the yoke member and extends forward where it is connected to a bell crank lever 43 having a foot pedal 44 thereon, said lever being drawn to one position by a spring 45. When the pedal is pressed to the position of Figure 2, the connections act to slide the gear 38 into a position in which it meshes with the gear 13 on the shaft G'. When pressure is removed from the pedal, the springs 41 and 45 will act to disengage the gears.

If it is desired to raise the car manually, a hand wheel 46 is operated to turn a shaft 47 mounted in a side frame bar F and carrying at its inner end a bevel gear 48 meshing with a bevel gear 49 on a shaft 50 having a gear 51 which may engage the teeth 9 on the standard 3.

The operation of the device appears obvious, but may be briefly recapitulated as follows. The lever 32 is placed in position to cause the teeth 9 to engage the gear 12, and the foot pedal 44 is pressed to throw the gear 38 into mesh with the gear 13. The engine will then rotate the shaft G' and through the gear 12 engaging the teeth 9 on the standard will raise the whole machine, the pedestal 5 engaging the ground. When the machine has been raised to the desired height, the lever 32 is moved to disengage the gear 12 and teeth 9 after the detent lever 35 is moved to cause the detent 34 to engage the teeth 10, and then the lever 32 is moved farther to bring the gears 13 and 14 into engagement. A rotation of the shaft G' now rotates the gear 14, shaft 15, bevel gear 16 and bevel gear 11 with the shaft 6. This causes the gear 7 to travel around the gear 4 and therefore swing the whole machine about the axis of the standard 3. When desired the machine can be lowered by reversing the rotation of the engine driving shaft.

It is obvious that numerous changes can be made in the form, proportion, and size of the various parts without departing from the spirit of my invention. The exact form may vary with the machine to which it is attached. Therefore the invention is to be considered as limited only by the scope of the appended claims.

I claim as my invention:

1. An automobile jack comprising a frame member adapted to be carried by a vehicle frame, a standard slidable in said frame, a shaft also slidable in said frame, said shaft and standard being geared together at their lower ends, means whereby the operation of said standard will raise the automobile, and means whereby the operation of said shaft will rotate the automobile about the axis of the standard.

2. An automobile jack comprising a frame member adapted to be carried by a vehicle frame, a standard slidable in said frame, a shaft also slidable in said frame, said shaft and standard being geared together at their lower ends, rack teeth on the standard, a pinion engaging the same, a bevel gear on the shaft, and means for driving either the pinion to raise the machine or the bevel gear to rotate the machine.

3. An automobile jack comprising a frame member adapted to be carried by a vehicle frame, a standard slidable in said frame, a shaft also slidable in said frame, said shaft and standard being geared together at their lower ends, means for engaging the standard to raise the machine, means for engaging the shaft to rotate the machine, and common driving mechanism for both of said means acting alternatively thereon.

4. An automobile jack comprising a frame member adapted to be carried by the vehicle, a counter shaft thereon adapted to be driven from the main driving shaft of the vehicle, means adapted to be connected with the counter shaft to raise the vehicle, manually operated means also adapted to raise the vehicle at will, and means driven from the counter shaft to rotate the vehicle when raised.

5. An automobile jack comprising a frame member adapted to be carried by the vehicle, a pedestal adapted to engage the ground and having a standard passing through the frame member, a gear on said pedestal, a shaft also passing through the frame member and having a gear at its lower end adapted to engage the first mentioned gear, and means to rotate said shaft and cause its gear to travel about the first gear and thereby rotate the machine.

6. An automobile jack adapted to be carried by the vehicle and comprising means for raising the vehicle, devices for operating said means from the engine of the vehicle, manually operated means for operating said raising means, means for holding the vehicle in raised position, and means also driven from the engine of the vehicle for rotating said vehicle when raised.

7. An automobile jack comprising a frame member adapted to be carried by a vehicle frame, a standard slidable in said frame, a shaft also slidable in said frame, said shaft and standard being geared together, a gear carried by said frame and engaging the standard to raise the automobile when operated, means for moving the standard out of engagement with said gear, and means for turning the automobile through the rotation of said shaft.

8. An automobile jack comprising a frame member adapted to be carried by a vehicle frame, a standard slidable in said frame, a shaft also slidable in said frame, said shaft and standard being geared together, means cooperating with said standard to raise the automobile, and means engaging said standard to hold the automobile in raised position as desired.

In testimony whereof, I have hereunto subscribed my name.

MAJOR MINGO.